(12) United States Patent
Foraci et al.

(10) Patent No.: US 8,414,706 B2
(45) Date of Patent: Apr. 9, 2013

(54) PROCESS AND PLANT FOR PRODUCING SUGAR PRODUCTS FROM GRAPES

(75) Inventors: Fabio Foraci, Mazara del Vallo (IT);
Pietro Foraci, Mazara del Vallo (IT);
Alessandro Foraci, Mazara del Vallo (IT)

(73) Assignee: Cantine Foraci S.R.L., Mazara del Vallo (TP) (IT)

( * ) Notice: Subject to any disclaimer, the term of this patent is extended or adjusted under 35 U.S.C. 154(b) by 403 days.

(21) Appl. No.: 12/877,090

(22) Filed: Sep. 7, 2010

(65) Prior Publication Data
US 2011/0048413 A1 Mar. 3, 2011

Related U.S. Application Data

(63) Continuation-in-part of application No. 11/821,454, filed on Jun. 21, 2007, now Pat. No. 7,935,189.

(51) Int. Cl.
*B01D 15/08* (2006.01)
*C13K 1/08* (2006.01)
*C13K 13/00* (2006.01)

(52) U.S. Cl.
USPC ........... 127/44; 127/46.2; 127/46.3; 210/656; 210/660; 210/661; 426/271; 426/599

(58) Field of Classification Search ............ 127/44, 127/46.2, 46.3; 210/656, 660, 661; 426/271, 426/599
See application file for complete search history.

(56) References Cited

U.S. PATENT DOCUMENTS

| | | | |
|---|---|---|---|
| 4,443,267 A | 4/1984 | Pansolli et al. | |
| 6,325,940 B1 | 12/2001 | Ikeda | |
| 7,935,189 B2 * | 5/2011 | Foraci | 127/46.2 |
| 2008/0314379 A1 | 12/2008 | Foraci | |

OTHER PUBLICATIONS

European Search Report for related App No. EP 11177099.6 dated Jan. 17, 2012.

* cited by examiner

*Primary Examiner* — David A Reifsnyder
(74) *Attorney, Agent, or Firm* — Ladas & Parry, LLP

(57) ABSTRACT

The process according to the invention, for producing sugar products from fruits, comprising the steps of:
i) demineralizing and decolorizing a fruit juice so as to bring its solid content to comprise from 99% wt to 99.99% wt of a mixture of saccharides, alcohols and flavonoids;
iii) separating by chromatography the demineralized and decolorized fruit juice so as to obtain a glucose-enriched fraction or a fructose-enriched fraction from the fruit juice. The solid content of the glucose-enriched fraction comprises at least from 70% wt to 99.99% wt of glucose; the solid content of the fructose-enriched fraction comprises from 70% wt to 99.99% wt of fructose.
The low content of anions and cations of the fruit juice to be is treated by chromatography greatly increase the yield of the chromatographic treatment and the purity of the glucose- and fructose-enriched fractions obtained through it.

42 Claims, 5 Drawing Sheets

PROCESS AND PLANT FOR PRODUCING SUGAR PRODUCTS FROM GRAPES

The present application is a continuation-in-part application of the co-pending, commonly assigned U.S. non-provisional application entitled "Process and plant for producing sugar products from grapes" filed on Jun. 21, 2007 and assigned Ser. No. 11/821,454. The entire contents of the foregoing non-provisional application are incorporated herein by reference.

FIELD OF THE INVENTION

The present invention relates to a process and plant for producing sugar products from fruits, in particular from grapes.

The process and the plant according to the invention can be used in particular for producing rectified concentrated must or rectified concentrated juice as an aqueous solution or in crystalline or powder form.

BACKGROUND OF THE INVENTION

In a number of applications of food- and healthcare industry use free glucose and fructose—that is glucose and fructose as monosaccharides—as ingredient or raw material is preferred to using sucrose. However free glucose and even more free fructose are at present prized substances, much more expensive than sucrose. For example free fructose is quite appreciated as sweetening agent in almost any foodstuff, in particular drinks, bakery products and jams, since it is the known sweetest naturally occurring carbohydrate. Free fructose is quite appreciated by diabetics since it raises glycaemia less than sucrose. In several cases also free glucose is preferred to sucrose as sweetener in the food industry, medicine and dietetics.

At present several processes are known for obtaining free glucose and fructose in industrial quantities. For example it is known to obtain fructose by separating invert sugar through chromatographic processes, as described for example in the U.S. Pat. Nos. 6,325,940 and 3,416,961. The invert sugar is obtained from beets by splitting sucrose in glucose and fructose with a chemical process and, according to current norms, in several countries may be considered and labelled neither "natural sugar" nor "all natural".

It is also currently known obtaining free fructose or glucose through the enzymatic conversion of a part of the glucose contained in the so-called "high-fructose-corn-syrup" (HFCS). However such glucose and fructose may be considered and labelled neither "natural sugars" nor "OGM free" as well. Furthermore free glucose and fructose obtained in massive quantities with known methods have a relatively low purity: for example current european norms require that, in order to be labelled as "pure fructose", a liquid fructose solution have a solid content of at least 95% wt fructose, while crystal fructose have a solid content of 99.5% wt fructose. On the contrary free glucose and fructose obtained with current mass-production processes often hardly achieve such degrees of purity, or achieve them at too high costs.

Therefore at present need is felt for having available massive quantities of free fructose and glucose—that is, as monosaccharides—at high purity and at a relatively low costs.

At present consumers and legislators appreciate more and more the so called "natural foods", "natural products" or "biological products", that is foods and ingredients obtained with processes as much direct and natural as possible, and having a taste as natural as possible. These demands are felt in the production of sweeteners and wine as well.

Grapes and fruits in general are known to internally contain free glucose and fructose and smaller amounts of other natural saccharides, referred to as "minor sugars" in the present description. Therefore theoretically speaking fruits could seem an immediate source of natural fructose and glucose. However until now no satisfying processes are known for extracting free glucose and fructose from fruits in industrial quantities at acceptable costs. What it has long been known is extracting from grapes an aqueous mixture containing water, fructose and glucose, and known as rectified concentrated must.

Liquid rectified concentrated must is used nowadays in the food industry as sweetener in yogurts, jams and juices and allows to use the indication "with no added sugars". Liquid rectified concentrated must is also used in wine industry for raising the proof spirit of fermenting must. It is also known to process liquid rectified concentrated must for producing rectified concentrated must in crystalline or powder form.

In particular, the Italian patent application RM99A000662 and the corresponding european application EP1096006 describe a process in which the liquid rectified concentrated must is initially concentrated to a concentration of 82° brix and then mixed with neutral 96° ethyl alcohol, in the proportion of 1:1 (i.e. 50% ethyl alcohol and 50% liquid rectified concentrated must).

The mixture of ethyl alcohol and liquid rectified concentrated must is stirred to enable the ethyl alcohol to extract the water contained within the sugars.

This operation results in separation into a lower layer of pasty grape sugar and an upper layer of ethyl alcohol and water.

The mixture of water and ethyl alcohol is then removed and distilled (to recover the ethyl alcohol) while the pasty matter is kept for at least 15 days at a temperature of $-\frac{5}{6}°$ C. for crystal formation.

After the time required for crystal formation (at least 15 days) the crystals are centrifuged, washed and maintained in a dryer to obtain the final product. The final product obtained does not present a true crystalline or powder structure, but instead is in the form of a gelatinous mass, consisting of: glucose and fructose sugars (and other minimal quantities—about 1% wt or less—of substances present in the grapes defined as "non-sugar"), ethyl alcohol and water.

In this respect, the ethyl alcohol removes only part of the water, the final drying not being able to eliminate the remainder of the water, which therefore remains incorporated in the interior of the gelatinous mass without being able to emerge from it.

The gelatinous mass is also unstable in air and difficult to work.

Another drawback is the high cost of the ethyl alcohol, both at the purchase stage and in its recovery; this evidently affects the cost of the final product.

The crystal maturing time is very lengthy and usually varies considerably depending on the particular conditions under which it takes place, this leading to difficult industrialization of the process.

In addition, crystal washing inevitably modifies the fructose/glucose weight ratio because of the greater water solubility of fructose compared with glucose.

To rebalance this ratio an attempt has been made to enrich the starting solution concentrated to 82° brix with the fructose recovered from the wash water and reconcentrated.

However the finished product obtained is unsatisfactory in terms of its dryness, taste and smell.

A scope of the present invention is providing a process and a plant for obtaining and separating concentrated natural monosaccharides in industrial amounts, in particular concentrated glucose and fructose, with a higher yield and at lower costs than with known processes or plants.

SUMMARY OF THE INVENTION

The technical aim, together with these and further objects, are attained, according to the invention, by a process and plant for producing sugar products from grapes or other fruit in accordance with the accompanying claims.

BRIEF DESCRIPTION OF THE DRAWINGS

Features and advantages of the invention will be more apparent from the description of a preferred but non-exclusive embodiment of the process and plant for producing sugar products from grapes according to the invention, illustrated by way of non-limiting example in the accompanying drawings, in which.

DETAILED DESCRIPTION OF THE INVENTION

In the present description the term "must" indicates a juice obtained from grapes, in particular a juice obtained by squeezing and/pr pressing grapes.

Figure 5:
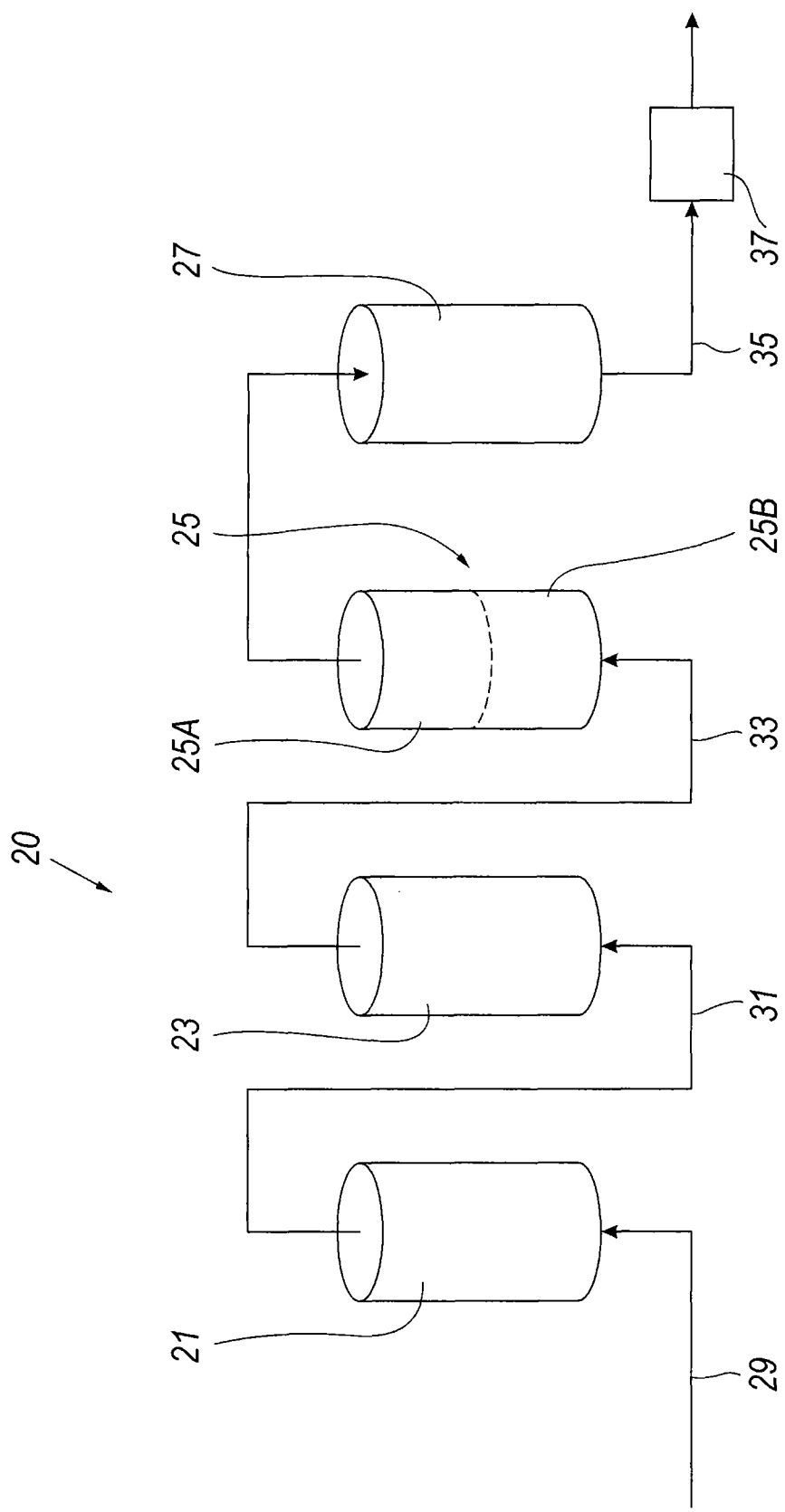
FIG. 5 shows a diagram of the decoloration and demineralization plant in which concentrated rectified must is obtained from grape- or fruit juice.

FIG. 5 shows a decoloration and demineralization plant for obtaining concentrated rectified fruit juice.

Such decoloration and demineralization plant, indicated with the overall reference 20, comprises a plurality of treating columns 21, 23, 25, 27, each of which containing a solid bed of ion exchange resins. As shown in FIG. 5, the treating columns can be four. Preferably some of the treating columns contain a bed of anion exchange resins and the remaining treating columns contain a bed of cationic resins. The columns 21-27 are fluidically connected by ducts 29, 31, 33, 35 through which the fruit juice flows during treatment.

Preferably each treating columns containing anion exchange resins is alternated with a treating column containing cation exchange resins along the fluidic path of the fruit juice to be treated, as shown on FIG. 5, where columns 21 and 25 contain anion exchange resins and columns 23 and 27 contain cation exchange resins.

Preferably the first treating column of the series contains an anion exchange resins, more preferably a weak anion exchange resin. Preferably the last treating column of the series contains cation exchange resins. Preferably the last treating column but one 25 contains a first bed 25A of weak anion exchange resins in its upper part, and a second bed 25B of strong anionic resins in its lower part.

Preferably the whole or at least the major part of the ion exchange resins of the treating columns 21-27 comprises a porous matrix of styrene-divinylbenzene copolymer.

Preferably at least the major part of the weak anion exchange resin in column 21 and in the bed 25A comprises tertiary amines as active group, such as the RELITE RAM1 manufactured by Mitsubishi Chemicals.

Preferably at least the major part of the cation exchange resin in columns 23 and 27 comprises sulphonic groups as active groups, such as the RELITE RPS manufactured by Mitsubishi Chemicals.

Preferably at least the major part of the strong anion exchange resin in the bed 25B comprises quaternary amines as active group, such as the RELITE RAP1 manufactured by Mitsubishi Chemicals.

Advantageously at least some of the ducts 29, 31, 33, 35 feed the liquid fruit juice to be treated from the bottom of the treating columns 21, 23, 25, 27, as shown in FIG. 5.

The above arrangement of the decoloration and demineralization plant 20 increases the amount of exchange resins effectively involved during treatment, reduces of about 50% the consumption of regenerants—such as hydrogen chloride and caustic soda- and water for regenerating the ion exchange resins, and reduces the time for diluting the fruit juice to be treated, thereby reducing the electric consumption of the next concentration stage.

The fruit juice is fed in through the duct 29 and drawn out from the duct 35.

The plant for producing sugar products preferably comprises a concentration plant 37 arranged downstream to the decoloration and demineralization plant and upstream to the separation plant 1 described hereinafter. The concentration plant can be for example a vacuum concentration plant per se known. The concentration plant 37 reduces, for example by evaporation, the water content of the decolorized and demineralized fruit juice produced by the plant 20, without substantially changing the composition if its solid content. Preferably the concentration plant 37 reduces to no more than 45% wt the water content of the decolorized and demineralized fruit juice. More preferably such water content is reduced by the concentration plant 37 to no more than 35% wt.

Said figures FIGS. 1-4 show a separation plant for separating sugar products from grapes or other fruits, indicated by the overall reference numeral 1.

The separation plant 1 comprises a plurality of chromatographic columns 2, 3, 4, 5, which are preferably connected together in series.

Each column 2-5 contains a solid bed of ion exchange resins, preferably comprising at least a major part of cation exchange resins. Preferably such cation exchange resin comprises a matrix of gel styrene-divinylbenzene copolymer and sulphonic functional groups, such as the DIAION UBK555, produced by Mitsubishi Chemical Corp.

Advantageously, during a working cycle each of the chromatographic columns 2, 3, 4, 5 implements in succession all the stages of the chromatographic process, but at each instant each column carries out stages of the process which are different from the other columns 2, 3, 4, 5.

Hence in practice, when one of the columns (for example the column 2) is in a predetermined stage of the chromatographic process, column 3 is in a different stage, column 4 in a still different stage, and column 4 in a further stage different from all the preceding stages.

Each column opportunely effects all the stages of the chromatographic process, a recirculation stage being provided for passing from one stage to the next. The recirculation stage is carried out by fluidically connecting all columns 2-5 in series.

Specifically, as shown in the figures, the plant comprises four columns each of which implements the following feed stages:

a glucose concentration stage;
a glucose stripping stage;
a fructose enrichment stage; and
a fructose concentration stage.

A set of four feed stages and four intermediate recirculation stages forms the complete working cycle of the chromatographic separation plant 1. In addition to the columns, the plant is provided with connection lines, a concentrated juice tank 6, a make-up water feeder 7 and a water heater 8 for heating the water to a predetermined temperature for the process.

In the concentrated juice tank 6 the concentrated fruit juice is stored, obtained from the concentration plant 37; in particular, if the fruit juice processed is grape juice, in the concentrated juice tank 6 an aqueous solution is stored of rectified concentrated must.

According to an aspect of the present invention, the decoloration and demineralization plant 20 is arranged for feeding to the chromatographic separation plant 1 a rectified must or a rectified fruit juice, the solid content of which is a mixture containing between 99-99.99% wt of a mixture of substances chosen from the group consisting of saccharides, alcohols and flavonoids or other polyphenols, wherein the saccharides comprise free fructose and free glucose.

In particular the decoloration and demineralization plant 20 is arranged for feeding to the chromatographic separation plant 1 a rectified must or a rectified fruit juice, the solid content of which contains less than 1% wt of impurities such as anions, cations and salts, in particular monoatomic anions and/or cations. In fact the ion exchange resins of the decoloration and demineralization plant 20 reduce the content of ionic substances of the treated fruit juice, leaving the content of saccharides, alcohols and flavonoids substantially unchanged.

Advantageously the decoloration and demineralization plant 20 is arranged for feeding to the chromatographic separation plant 1 a rectified must or a rectified fruit juice, the solid content of which comprises:

about 0.5-99.99% wt, preferably about 0.5-50% and more preferably about 0.5-10% of minor sugars and/or oligosaccharides such as pentoses, hexoses, ribose, arabinose, xilose, mannose, galactose, ramnose; and/or about 0.5-99.99% wt, preferably about 0.5-50% and more preferably about 0.5-5% of polyhydric alcohols such as mannitol, sorbitol, glycerol, erythritol, arabitol, meso- and scillo-inositol;

about 0.0001-99.99% wt, preferably 0.0001-50% wt and more preferably about 0.0005-1% wt of flavonoids such as quercetin and myricetin.

The plant is also provided with a glucose accumulation tank 10 and a fructose accumulation tank 11.

As in the embodiment shown in FIGS. 1-4, the liquid eluent can be fed at the top of each column 2-5, and the liquid eluent can be withdrawn from the bottom of the same column.

The plant operation is evident from that described and illustrated, and is substantially the following.

Figure 1:
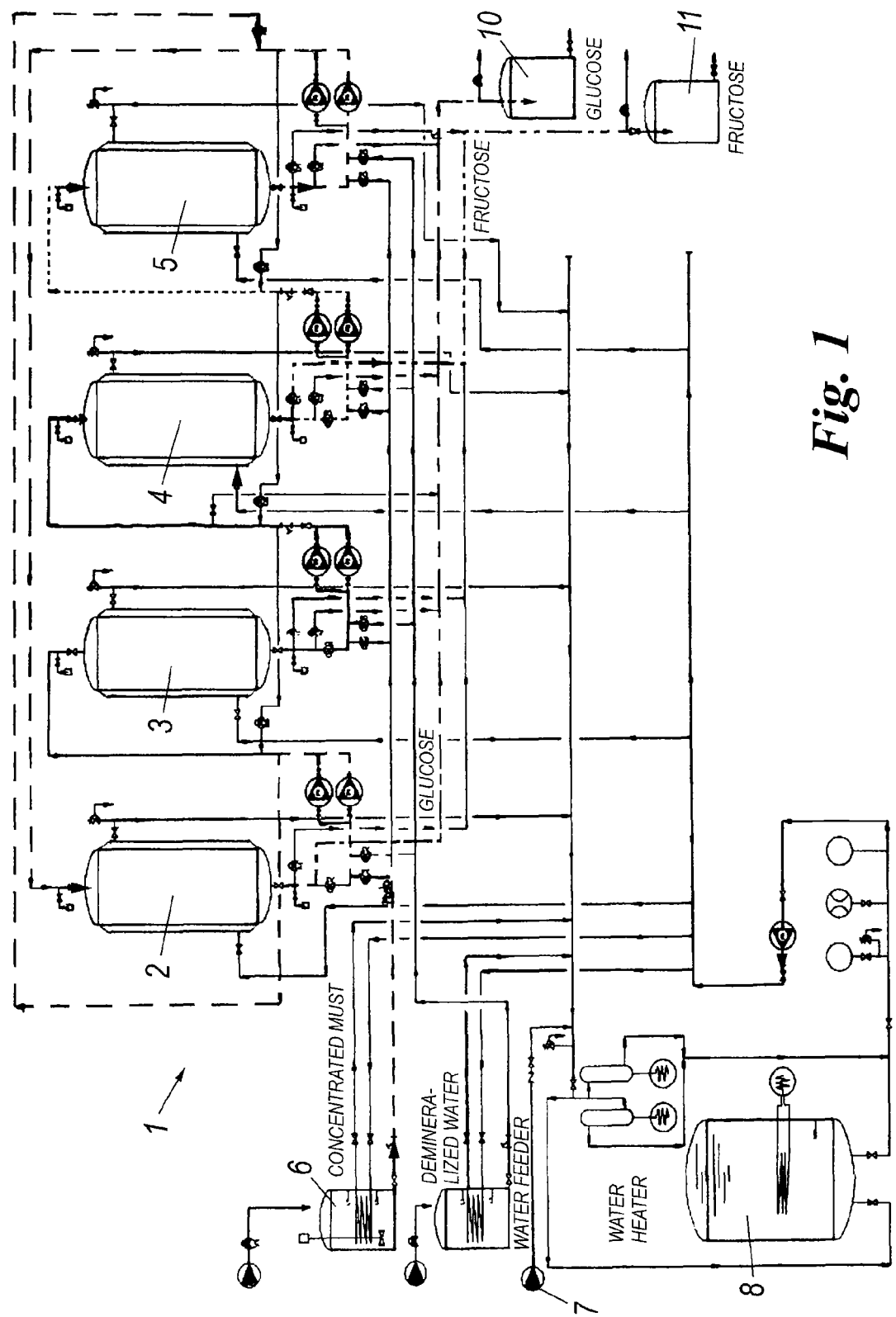
FIGS. 1-4 show the chromatographic plant of the invention in four different stages of operation.

In the first feed overall stage shown in FIG. 1, column 2 is shown in the absorption stage (for concentrating the glucose) and is fed with a fraction rich in glucose and fructose originating from column 5 (as indicated by the dashed line).

A glucose-enriched fraction is withdrawn from the bottom of column 2 and is fed to the glucose tank 10 (dashed and dotted line).

Column 3 is in the purification stage (to implement glucose stripping), and is at rest, without feed or discharge.

Column 4 is in the desorption stage (i.e. fructose enrichment), and is fed is with water (full line), which is used to displace the glucose fraction contained in it (column 4).

The fructose fraction is withdrawn from the bottom of column 4 and is fed to the tank 11 (dashed and double dotted line); however not all the fructose is withdrawn, hence part of the fructose is fed to the next column 5 (circled line).

Column 5 is in the concentration stage (the fructose is concentrated therein), in which it (column 5) is fed with the residual fraction of column 4 still rich in fructose (circled line), its bottoms, together with fresh must or other fresh fruit juice, being fed to column 1 (dashed line).

This configuration is maintained by the plant for 6 minutes and 30 seconds (six and a half minutes).

Figure 2:
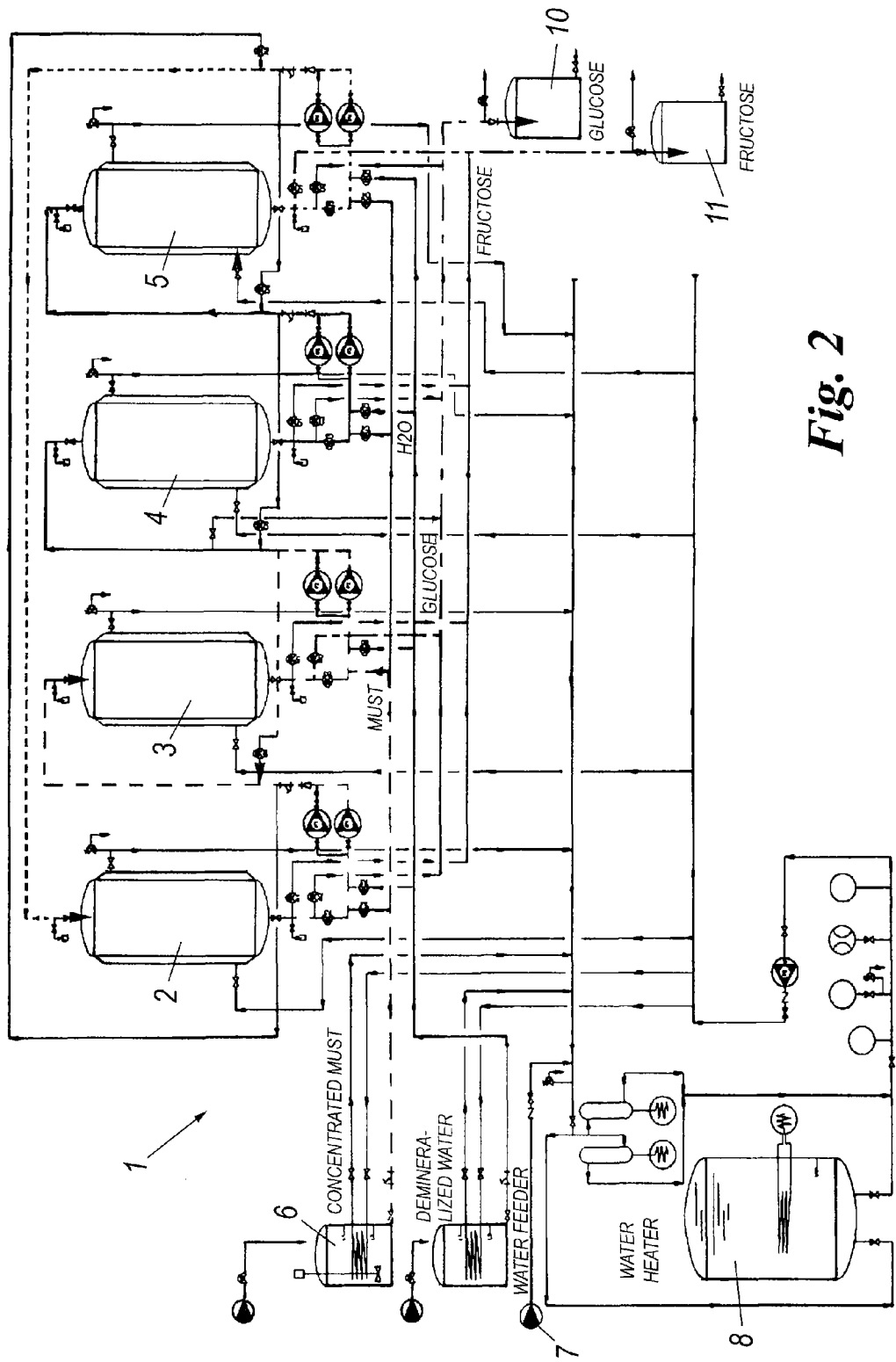

After a first recirculation step of 19 minutes, the plant then assumes the configuration of FIG. 2, carrying out a second feed overall stage.

In this configuration, column 2 is in the concentration stage, it (column 2) being fed with the residual fraction from column 5 still rich in fructose (circled line), the bottoms from this column, together with fresh must or other fresh fruit juice, being fed to column 3 (dashed line).

Column 3 is in the absorption stage, in which it is fed with the fraction rich in glucose and fructose originating from column 2 and with concentrated must other concentrated fruit juice (dashed line); a glucose-enriched fraction is withdrawn from the bottom of column 3 and fed to the tank (dashed and dotted line).

Column 4 is in the purification stage and is a rest, without feed or discharge.

Column 5 is in the desorption stage, and is fed with water (to displace the fructose fraction contained in it, full line), the fructose fraction being withdrawn from its bottom and fed to the tank 11 (dashed and double dotted line), the unextracted fructose being fed to column 2 (circled line). This configuration is maintained by the plant for 6 minutes and 30 seconds (six and a half minutes).

Figure 3:
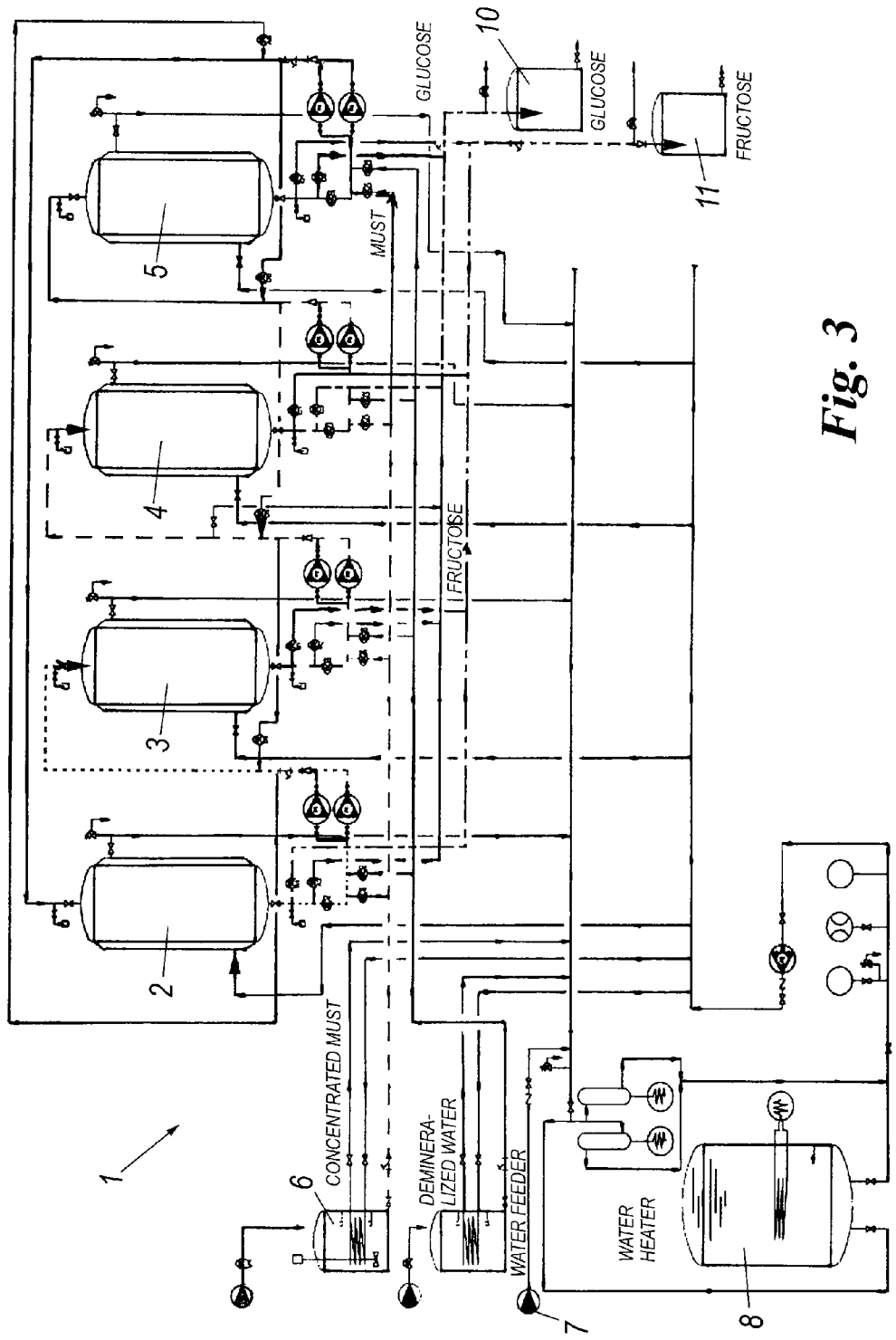

After a second recirculation step of 19 minutes, the plant then assumes the configuration of FIG. 3, carrying out a third feed overall stage.

Column 2 is in the desorption stage, and is fed with water (to displace the fructose fraction contained in it, full line), the fructose fraction being withdrawn from its bottom and fed to the tank 11 (dashed and double dotted line), the unextracted fructose being fed to column 3 (circled line).

Column 3 is in the concentration stage, in which it (column 3) is fed with the residual fraction of column 2 still rich in fructose (circled line), its bottoms, together with fresh must or other fresh fruit juice, being fed to column 4 (dashed line).

Column 4 is in the absorption stage, in which it is fed with the fraction rich in glucose and fructose originating from column 3 and with concentrated must or other concentrated fruit juice (dashed line); a glucose-enriched fraction is withdrawn from the bottom of column 4 and fed to the tank (dashed and dotted line).

Column 5 is in the purification stage and is a rest, without feed or discharge.

This configuration is maintained by the plant for 6 minutes and 30 seconds (six and a half minutes).

Figure 4:
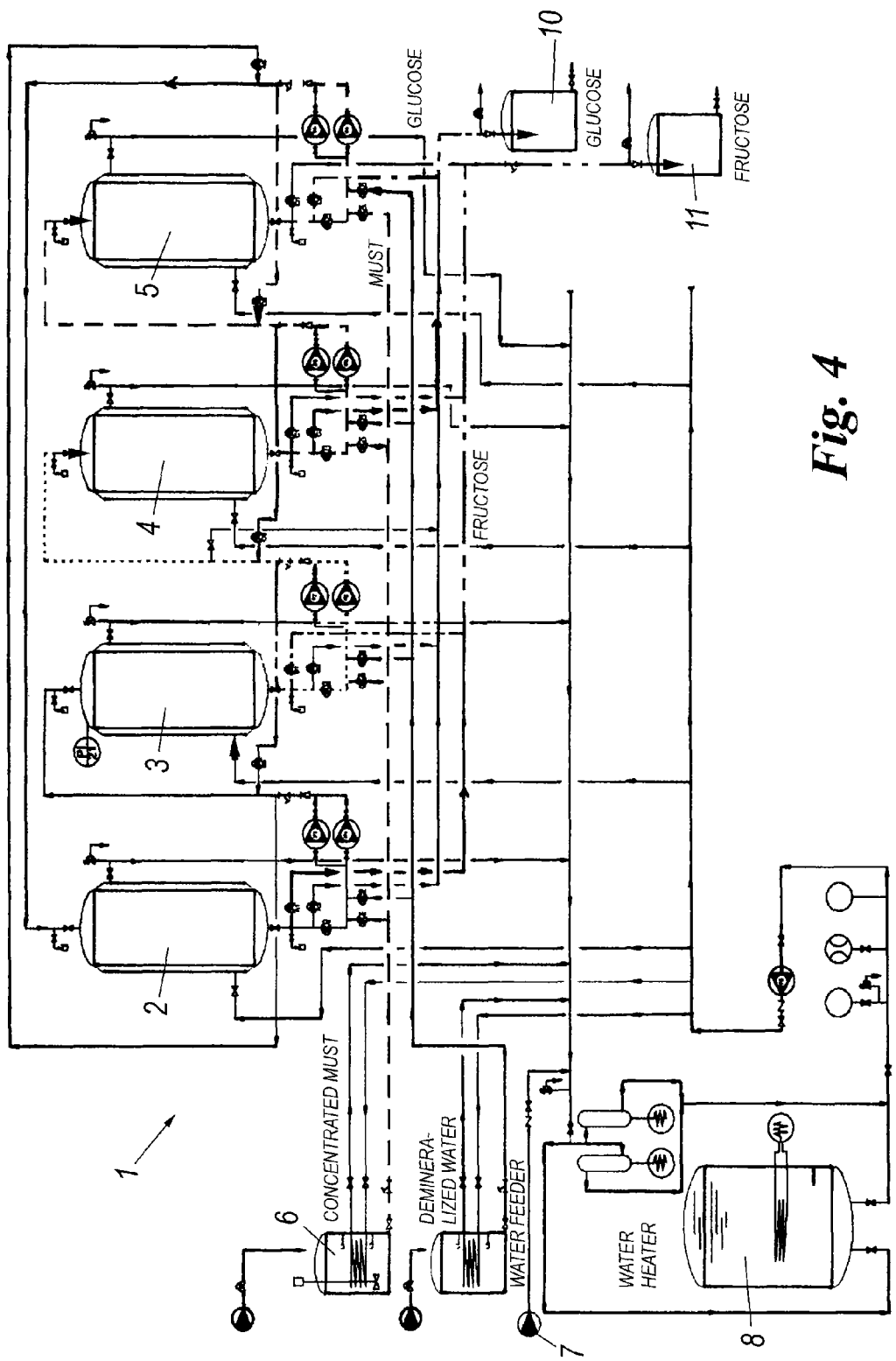

After a third recirculation step of 19 minutes, the plant then assumes the configuration of FIG. 4, carrying out a fourth feed overall stage.

Column 2 is in the purification stage and is a rest, without feed or discharge.

Column 3 is in the desorption stage, and is fed with water (to displace the fructose fraction contained in it, full line), the fructose fraction being withdrawn from its bottom and fed to the tank 11 (dashed and double dotted line), the unextracted fructose being fed to column 4 (circled line).

Column 4 is in the concentration stage, in which it is fed with the residual fraction of column 3 still rich in fructose (circled line), the bottoms of column 4, together with fresh must or other fresh fruit juice, being fed to column 5 (dashed line).

Column 5 is in the absorption stage, in which it is fed with the fraction rich in glucose and fructose originating from column 4 and with concentrated must or other concentrated fruit juice (dashed line); a glucose-enriched fraction is withdrawn from the bottom of column 5 and fed to the tank (dashed and dotted line).

This configuration is maintained by the plant for 6 minutes and 30 seconds (six and a half minutes).

After a further fourth recirculation step of 19 minutes, the plant again assumes the configuration of FIG. 1, starting a new working cycle by to repeating the first feed overall stage.

At the end of these working cycles the glucose tank 10 contains a liquid glucose-enriched solution the solid content of which comprises at least from 70% wt to 99.99% wt of glucose, for example an aqueous solution at about 27° Brix, while the fructose tank 11 contains a liquid fructose-enriched solution the solid content of which comprises at least from 70% wt to 99.99% wt of fructose, for example an aqueous solution at about 42° Brix.

Like in the present embodiment, the liquid glucose-enriched and fructose-enriched solutions can then be separately fed to the vacuum concentration plant 37 for reducing their content of water.

After processing in the vacuum concentration plant 37, the two following liquid solutions can be obtained:

a liquid concentrated fructose mixture at 82° Brix, the solid content of which contains about at least 96% wt fructose, no more that 2% wt glucose, about 2-4% wt or even less of minor sugars, no more that 1% wt of impurities, that is substances different from saccharides, alcohols and flavonoids; impurities can be in particular anions, cations and salts thereof;

a liquid concentrated glucose mixture at about 90% at 72° Brix, the solid content of which contains for example about at least 90% wt glucose, no more that 8% wt fructose, about 2-10% wt or even less of minor sugars, no more that 1% wt of the above-said impurities.

After mixing and/or dilution when necessary for reaching the desired rating, these concentrated fructose- and/or glucose fractions obtained from grapes or other kind of fruits can already be marketed at this stage to as liquid solutions, and are suitable for example as sweetener of yogurt, jam, juices and other drinks in the food industry. Since these concentrated liquid fractions have been obtained simply by extracting fructose, glucose and other oligosaccharides already contained as such in fruits, the final food products containing can be labelled "sugar free" or "all naturals" in is compliance with the most current european and extra-european norms.

In the wine industry the above concentrated fructose- and/or glucose fractions obtained from grapes can be used for raising the proof spirit of fermenting must or for sweetening wines.

Thanks to the content of minor sugars already contained in natural fruits—such as pentoses, hexoses, ribose, arabinose, xilose, mannose, galactose, ramnose—, of polyhydric alcohols and of flavonoids, the concentrated fructose- and/or glucose fractions obtainable according to the invention maintain the aromas, tastes and aftertastes of natural fruit and fits better in recipes of traditional and/or natural foods.

Alternatively such fructose and/or glucose obtained by grapes can be further dried, crystallized and/or pulverized as described with more details later.

The described plant implements a process for producing sugar products from grapes or other kinds of fruits.

The process according to the invention comprises treating a solution of liquid rectified concentrated must or other liquid rectified concentrated fruit juice by chromatography, to separate at least one sugar contained in it. In particular the process according to the invention, for producing sugar to products from grapes or other fruits comprises the steps of:

i) providing a fruit juice comprising free glucose and free fructose;

ii) demineralizing and decolorizing the fruit juice so as to bring its solid content to comprise from 99% wt to 99.99% wt of saccharides, alcohols and flavonoids, and from 1% wt to 0.01% wt of anions and cations;

iii) separating by chromatography the demineralized and decolorized fruit juice so as to obtain at least a glucose-enriched fraction or a fructose-enriched fraction from the fruit juice by chromatography, wherein the solid content of the glucose-enriched fraction comprises at from 70% wt to 99.99% wt of glucose, and the solid content of the fructose-enriched fraction comprises from 70% wt to 99.99% wt of fructose.

It is believed that the particularly low content of anions, cations and other non-sugars, non polyhydric alcohols and non flavonoids of the liquid decolorized and demineralized fruit juice fed to the chromatographic plant 1, increases the efficiency of the chromatographic plant itself, which can produce for long times—such as several years—high purity fructose- and glucose-enriched fractions, with high yields and substantially with no need of regenerating or replacing the ion exchange resins.

The inventor noticed that if a less pure decolorized and demineralized fruit juice is fed to the chromatographic plant 1—for example having a solid content of 3-5% wt anions+cations+non-sugars+non polyhydric alcohols+non flavonoids of the liquid decolorized and demineralized fruit juice fed to the chromatographic plant 1—the purity of the final glucose and fructose worsen quickly.

The liquid rectified concentrated must or other liquid concentrated fruit juice used for separating the sugars has preferably a concentration of 65° brix before treatment, i.e. after processing in the decolorizing and demineralization plant 20 and before being fed to the chromatographic columns 2-4.

The separated sugars obtained from the chromatographic plant 1 is comprise a liquid solution of glucose and a liquid solution of fructose.

At least one of these obtained sugars is then separated from the liquid solution containing it, this separation being achieved by crystallization in the metastable region of the treated liquid solution (i.e. of the glucose and/or fructose liquid solution). As "metastable region" the region of the phase diagram of the treated liquid solution is intended, where formation of crystals of glucose or fructose starts.

The fructose crystallization comprises the steps of concentrating the liquid solution of fructose, possible seeding with fructose crystals (to limit crystallization time), cooling, fructose crystal growth, and crystal separation from the liquid solution.

Advantageously, during the concentration step the liquid solution is brought to a concentration of 80-84° brix, for example by simple evaporation of water.

Any subsequent seeding is carried out preferably by adding fructose crystals of less than 0.15 millimetre in size to the liquid solution in a quantity of 0.95-5.00 wt %.

Cooling is carried out by cooling the liquid solution to a temperature of 10-15° C., separation being by centrifuge.

For example the fructose solution—also referred to as "concentrated fructose mixture" above—is brought to 82° brix at a temperature of 12° C., and seeding is carried out with 1% of crystals.

Drying of the crystals obtained (in a static dryer under vacuum) presented no difficulty, the crystals being stable at ambient temperature under humidity conditions of near or greater than 60%.

This way crystals of pure glucose and pure fructose can be obtained, the solid contents of which comprise at least 99.5-99.9% wt of glucose and at least 99.5-99.9% wt of fructose respectively.

It has been noticed that the above mentioned low content of impurities, that is substances different from saccharides, alcohols and flavonoids, in particular anions and cations of the liquid decolorized and demineralized fruit juice fed to the chromatographic plant 1 allows an easier formation of glucose and fructose crystals.

The crystal fructose so obtained can be sold for example as sweetener in a number of food products, such as drinks, jams and bakery products. The above mentioned minor contents of polyhydric alcohols and flavonoids gives to the crystal- or powder fructose the characteristic natural taste of the fruits from which it was extracted.

The glucose separation comprises the steps of concentrating the liquid solution of glucose—also referred to as "concentrated glucose mixture" above—, cooling and granulating the glucose, and drying the glucose.

The concentration of the liquid solution of concentrated glucose is brought suitably to 68-82° brix, and preferably to 70-74° brix.

Cooling is carried out to a temperature of 10-15° C. and preferably to 11-13° C., granulation being simultaneous with cooling.

Advantageously, the mixture is stirred during cooling, granulation and drying under vacuum.

For example, the glucose mixture has been concentrated to 72° brix and then brought to a temperature of 12° C.

The glucose obtained in this manner does not present a crystalline structure, is easily dried in a static dryer and has the form of a powder; it can be marketed as sweetener in particular foods in which a more neutral taste is desired.

Finally, the glucose separated from its liquid mixture and the fructose separated from its liquid mixture are advantageously mixed together to form the rectified concentrated must in crystalline or powder form. The crystal or powder form is more suitable for example for bakery products.

It has been found in practice that the process and plant for producing sugar products from grapes or other kind of fruit according to the invention are particularly advantageous, because they enable rectified concentrated fruit juice, in particular rectified concentrated must, to be obtained in industrial quantities and in liquid, crystalline or powder form of very high quality, in particular a very high purity.

For example, if each of the columns 2, 3, 4, 5, 21, 23, 25, 27 contains about 10 m3 of ion exchange resin, the plant 1 previously described is able to produce about 72 m3/day of a liquid fructose-enriched fraction at 42° brix, 96 m3/day of a liquid glucose-enriched fraction at 26° brix, about 10,000 kg/day of crystal- or powder fructose-enriched fraction and about 11,000 kg of crystal- or powder glucose-enriched fraction, with a consumption of about 0.265 kWh of electric power and 0.150 smc of methane for each kilogram of end product.

Another factor that makes easier achieving a higher degree of purity of the obtained monosaccharides is that they are present as such in fruits and, according to the invention, are simply extracted from fruits, instead of splitting molecules of natural polysaccharides.

The process and plant for producing sugar products from grapes conceived in this manner are susceptible to numerous modifications and variants, all falling within the scope of the inventive concept; for example it can be used for producing sugar products, and in particular fructose, from other kinds of fruits such as apples, dates, pears, peaches, apricots, figs, oranges, grapefruits. Moreover all details can be replaced by technically equivalent elements.

Summing up, the previous teachings allow providing a process and plant for producing sugar products from grapes or other fruit by which the technical drawbacks of the known art are eliminated.

The previous teachings allow providing a process and plant which enable a crystalline or powder product to be obtained rather than a gelatinous mass.

In particular, through a process according to the previous teachings the water can be removed from the gelatinous mass very efficiently.

Thanks to the previous teachings a process and a plant can be provided, enabling a finished product to be obtained which is stable in air and easily worked; furthermore a process and plant can be provided, which do not require the use of ethyl alcohol, substantially reducing thereby the related costs.

A process and a plant according to the previous teachings can be easily industrialized.

A process and plant according to the previous teachings enable a finished product to be obtained which presents satisfactory characteristics in terms of dryness, taste and smell.

We claim:

1. Process for producing sugar products from fruits, comprising the steps of:
    i) providing a fruit juice comprising free glucose and free fructose;
    ii) demineralizing and decolorizing the fruit juice so as to bring its solid content to comprise from 99% wt to 99.99% wt of a mixture of substances chosen from the group consisting of saccharides, alcohols and flavonoids or other polyphenols;
    iii) separating by chromatography the demineralized and decolorized fruit juice so as to obtain at least a glucose-enriched fraction and/or a fructose-enriched fraction from the fruit juice, wherein the solid content of the glucose-enriched fraction comprises at least from 70% wt to 99.99% wt of glucose, and the solid content of the fructose-enriched fraction comprises from 70% wt to 99.99% wt of fructose.

2. Process according to claim 1, wherein the step ii) of demineralizing and decolorizing the fruit juice brings its solid content to comprise from 99% wt to 99.8% wt of a mixture of substances chosen from the group consisting of saccharides, alcohols and flavonoids or other polyphenols.

3. Process according to claim 1, wherein the step ii) of demineralizing and decolorizing the fruit juice brings its solid content to comprise from 99% wt to 99.99% wt of saccharides, wherein the saccharides comprise one or more substances chosen from the group consisting of glucose, fructose, pentoses, hexoses, ribose, arabinose, xilose, mannose, galactose, ramnose, monosaccharides, disaccharides, trisaccharides, tetrasaccharides.

4. Process according to claim 1, wherein the step ii) of demineralizing and decolorizing the fruit juice brings its solid content to comprise from 99% wt to 99.99% wt of saccharides, wherein the saccharides comprise glucose and/or fructose, and one or more of the following substances: pentoses, hexoses, ribose, arabinose, xilose, mannose, galactose, ramnose.

5. Process according to claim 1, wherein the step ii) of demineralizing and decolorizing the fruit juice comprises the step of contacting the liquid fruit juice with one or more beds of ion exchange resins.

6. Process according to claim 5, wherein in step ii) at least one of the beds of ion exchange resins comprises ion exchange resins having tertiary amine groups as functional groups or other weak anion exchange resins.

7. Process according to claim 5, wherein step ii) of demineralizing and decolorizing the fruit juice comprises the step of contacting the liquid fruit juice with a succession of beds of anion exchange resins and cation exchange resins.

8. Process according to claim 1, wherein in step i) the fruit juice is obtained from one or more of the following fruits: grapes, apples, dates, pears, peaches, apricots, figs, oranges, grapefruits.

9. Process according to claim 1, wherein step ii) comprises feeding the fruit juice in one or more columns each containing a cation and/or an anion exchange resin.

10. Process according to claim 9, wherein the major part of the anion and/or cation exchange resin of step ii) comprises a matrix of styrene-divinylbenzene copolymer.

11. Process according to claim 9, wherein the major part of the anion and/or cation exchange resin of step ii) comprises tertiary and/or quaternary amines as functional groups.

12. Process according to claim 1, wherein step iii) comprises feeding the decolorized and demineralized fruit juice in one or more columns each containing a ion exchange resin.

13. Process according to claim 12, wherein step iii) comprises feeding the decolorized and demineralized fruit juice in one or more columns each containing a cation exchange resin.

14. Process according to claim 13, wherein the major part of the cation exchange resin of step iii) comprises a matrix of styrene-divinylbenzene copolymer.

15. Process according to claim 13, wherein the major part of the cation exchange resin of step iii) comprises sulphonic groups as functional groups.

16. Process according to claim 1, wherein in step iii) the glucose-enriched fraction or a fructose-enriched fraction are separated by chromatography from a liquid rectified concentrated fruit juice, the liquid rectified concentrated fruit juice before chromatographic treatment having a content of water from 5% wt to 45% wt.

17. Process according to claim 1, wherein the solid content of the glucose-enriched fraction comprises from 85% wt to 99.99% wt of glucose.

18. Process according to claim 1, wherein the solid content of the fructose-enriched fraction comprises from 90% wt to 99.99% wt of fructose.

19. Process according to claim 1, wherein at least one of the glucose-enriched fraction and fructose-enriched fraction is an aqueous solution.

20. Process according to claim 1, wherein step iii) comprises solidifying the glucose-enriched fraction, so as to obtain an amorphous fructose-enriched fraction comprising from 90% wt to 99.99% wt of fructose.

21. Process according to claim 1, wherein step iii) comprises solidifying the liquid fructose-enriched fraction, so as to obtain a crystalline or amorphous fructose-enriched fraction comprising from 95% wt to 99.99% wt of fructose.

22. Process according to claim 1, wherein step iii) comprises separating at least a glucose-enriched fraction, the solid content of which comprises from 0.5% wt to 10% wt of a mixture consisting of one or more of the following substances: pentoses, hexoses, ribose, arabinose, xylose, mannose, galactose, ramnose.

23. Process according to claim 1, wherein step iii) comprises separating at least a fructose-enriched fraction, the solid content of which comprises from 0.5% wt to 10% wt of a mixture consisting of one or more of the following substances: pentoses, hexoses, ribose, arabinose, xylose, mannose, galactose, ramnose.

24. A process according to claim 1, wherein the demineralized and decolorized fruit juice resulting from step ii) is liquid rectified concentrated must having a concentration of 65° brix.

25. A process according to claim 1, wherein step iii) comprises solidifying the liquid fructose-enriched fraction by crystallization preferably within the metastable region of the treated liquid fructose-enriched fraction.

26. A process as claimed in claim 25, wherein crystallization of the liquid fructose-enriched fraction comprises the steps of concentrating and cooling the fructose-enriched fraction, growing fructose crystals, and separating the crystals from the liquid fructose-enriched fraction.

27. A process as claimed in claim 26, wherein the fructose crystals are grown by seeding the concentrated liquid fructose-enriched fraction with fructose crystals before cooling the fraction.

28. A process as claimed in claim 26, wherein crystallization of the liquid fructose-enriched fraction comprises the steps of concentrating the fructose-enriched fraction at about 80-84° brix.

29. A process as claimed in claim 27, wherein the fructose crystals are grown by seeding the concentrated liquid fructose-enriched fraction with fructose crystals in a quantity from 0.95 to 5% wt.

30. A process as claimed in claim 27, wherein the fructose crystals are grown by seeding the concentrated liquid fructose-enriched fraction at least with fructose crystals having a size comprised from 0.001 millimeter to 0.15 millimeter.

31. A process as claimed in claim 26, wherein crystallization of the liquid fructose-enriched fraction comprises the steps of cooling the fructose-enriched fraction from 10 to 15° C.

32. A process as claimed in claim 26, wherein crystallization of the liquid fructose-enriched fraction comprises the steps of separating the crystals from the liquid fructose-enriched fraction by centrifugation.

33. A process according to claim 1, wherein in step iii) the glucose-enriched fraction is separated by carrying out the steps of concentrating, cooling, granulating and drying the liquid glucose-enriched fraction.

34. A process according to claim 33, wherein in step iii) the liquid glucose-enriched fraction is concentrated to 68-82° brix, and preferably to 70-74° brix.

35. A process according to claim 33, wherein in step iii) the liquid glucose-enriched fraction is cooled to a temperature of 10-15° C., and preferably to 11-13° C.

36. A process according to claim 33, wherein in step iii) the liquid glucose-enriched fraction is granulated at the same time as when cooled.

37. A process according to claim 36, wherein in step iii) the liquid glucose-enriched fraction is stirred during cooling and granulation.

38. A process according to claim 33, wherein in step iii) the liquid glucose-enriched fraction is dried under vacuum.

39. A process according to claim 1, further comprising the step iv) of mixing together glucose separated from the liquid glucose-enriched fraction, and fructose separated from the liquid fructose-enriched fraction.

40. A process according to claim 1, comprising the step of processing the fruit juice by passing it through a plurality of chromatographic columns fluidically connected together in series, each column implementing in succession all the steps of the chromatographic process, but implementing steps of the process which are different from the other columns, a recirculation step being provided in passing from one step to the next.

41. A process according to claim 1, comprising the step of processing the fruit juice by passing it through at least four chromatographic columns which implement a glucose concentration step, a glucose stripping step, a fructose enrichment step and a fructose concentration step.

42. Process for producing sugar products from fruits, comprising the steps of:
  i) providing a fruit juice comprising free glucose and free fructose;
  ii) demineralizing and decolorizing the fruit juice so as to bring its solid content to comprise from 0.0001% wt to 1% wt of impurities chosen from the group consisting of anions, cations and salts;
  iii) separating by chromatography the demineralized and decolorized fruit juice so as to obtain at least a glucose-enriched fraction and/or a fructose-enriched fraction from the fruit juice, wherein the solid content of the glucose-enriched fraction comprises at least from 70% wt to 99.99% wt of glucose, and the solid content of the fructose-enriched fraction comprises from 70% wt to 99.99% wt of fructose.

* * * * *